United States Patent [19]

Stevens

[11] 4,197,346

[45] Apr. 8, 1980

[54] SELF-CONTAINED PRESSURE-SENSITIVE RECORD MATERIAL AND PROCESS OF PREPARATION

[75] Inventor: Michael F. Stevens, Appleton, Wis.

[73] Assignee: Appleton Papers Inc., Appleton, Wis.

[21] Appl. No.: 950,062

[22] Filed: Oct. 10, 1978

[51] Int. Cl.[2] .................... B32B 3/26

[52] U.S. Cl. .................... 428/307; 106/21; 106/22; 106/30; 106/32; 252/317; 264/7; 282/27.5; 427/150; 427/151; 428/308; 428/309; 428/914

[58] Field of Search .................... 427/150, 151; 428/914, 428/307, 308, 309; 106/21, 22, 30, 32, 308 M; 252/317; 282/27.5; 264/4, 7

[56] References Cited

U.S. PATENT DOCUMENTS

| | | | |
|---|---|---|---|
| 2,929,736 | 3/1960 | Miller et al. | 428/307 |
| 3,516,845 | 6/1970 | Brockett | 282/27.5 |
| 3,576,660 | 4/1971 | Bayless et al. | 282/275 |
| 3,625,736 | 12/1971 | Matsukawa et al. | 282/27.5 |
| 3,723,156 | 3/1973 | Brockett et al. | 282/27.5 |
| 3,901,986 | 8/1975 | Brockett et al. | 427/150 |
| 3,936,573 | 2/1976 | Brockett | 427/150 |
| 4,100,103 | 7/1978 | Foris et al. | 106/308 M |

*Primary Examiner*—Ronald H. Smith
*Assistant Examiner*—Janyce A. Bell
*Attorney, Agent, or Firm*—Birch, Stewart, Kolasch and Birch

[57] ABSTRACT

A self-contained pressure-sensitive record material comprising a substrate and a coating thereon of an interspersed mixture of pressure-rupturable capsules of an oily solvent solution of a substantially colorless basic chromogenic material and capsules of solid co-reactant acidic resin particles, said co-reactant acidic resin being capable of producing a color upon contact with the chromogenic material. The capsule mixture is applied to the substrate in a single coating step, resulting in a greater production efficiency. The resulting record material provides better imaging characteristics with less print bleed than self-contained systems known in the prior art.

26 Claims, No Drawings

SELF-CONTAINED PRESSURE-SENSITIVE RECORD MATERIAL AND PROCESS OF PREPARATION

BACKGROUND OF THE INVENTION

1. Field of the Invention

The present invention relates to an improved pressure-sensitive record material. More particularly, the invention is directed to a self-contained carbonless paper having a single layer of interspersed color-forming capsules and encapsulated co-reactant acidic resin. Even more particularly, the present invention provides a self-contained carbonless paper having the mark-forming components comprising capsules of an oily solution of substantially colorless basic chromogenic material and capsules of co-reactant acidic resin particles interspersed on the same substrate, which paper is prepared in a single coating step.

DESCRIPTION OF THE PRIOR ART

In the past, there have been provided pressure-sensitive mark-forming units and systems comprising a chromogenic material, generally present as a solute in a liquid solvent which is the core or nucleus material in pressure-rupturable capsules coated on a supporting sheet material and an insoluble solid mark-forming component distributed in particulate form on a supporting sheet material, both components being arranged in proximate relation to each other, so that, upon the application of marking pressure to the capsules, the capsules rupture and release the oily solution of chromogenic material, with the consequent contact of the mark-forming components producing a mark or color in those regions where pressure is applied. Many prior art systems comprised a microencapsulated solution of chromogenic material, such as Crystal Violet Lactone, distributed as isolated liquid droplets on the underside or backside of a supporting sheet, and a solid particulate material reactive therewith to form a colored mark coated on the top or front of an adjacent or contiguous sheet. Marking pressure ruptures the capsules and transfers the solution of chromogenic material to the solid material. The reaction of the colorless chromogenic material with the solid material produces a colored mark which corresponds to the rupture pattern.

In some prior systems, there was provided a so-called self-contained pressure-sensitive record sheet wherein the capsules containing the substantially colorless chromogenic material and particles of solid coreactant material were arranged on a single support sheet, but in separate layers or coatings. British Pat. No. 1,215,618 discloses a pressure-sensitive record sheet having a coating of encapsulated colorless chromogenic materials and a top coating comprising a mixture of kaolin clay particles and an acidic phenolic polymeric coreactant material.

Configurations comprising a self-contained, single coating of color-forming reactant material have been proposed in the prior art. U.S. Pat. No. 3,576,660 discloses a pressure-sensitive record sheet having encapsulated color-forming co-reactants in a single coating layer. In this system, one group of capsules contains an oily solution of a chromogenic material and a second group of capsules contains an oily solution of phenolic polymeric material. Special capsule wall materials were used to help solve the problem of premature coloration caused by the close proximity of the color-forming reactants in the single layer coating.

Each of U.S. Pat. Nos. 2,929,736, 3,481,759 and 3,672,935 discloses a coated mixture of encapsulated chromogenic materials and unencapsulated solid particles. The chromogenic materials and the solid particles react with each other to form a colored mark when they are brought into contact. More specifically, U.S. Pat. No. 2,929,736 discloses a heat- and pressure-sensitive record sheet having an encapsulated liquid chromogenic solution, solid co-reactive clay particles and a polymeric film-forming protective material, all mixed together to yield a single, color-forming coating layer. U.S. Pat. No. 3,481,759 discloses single-coating, self-contained pressure-sensitive record material having a color forming layer of capsules containing a liquid solution of color reactant, polymeric binder material and metal resinate coreactant particles. U.S. Pat. No. 3,672,935 teaches several forms of pressure-sensitive record material including the so-called self-contained sheets wherein an encapsulated liquid solution of one co-reactant and solid particles of another co-reactant can be combined in a single coating layer. In one embodiment, capsules of an oily solution of co-reactant are combined with unencapsulated solid particles of chromogenic compounds and, in another embodiment, capsules of oily solvent are combined with unencapsulated solid particles of chromogenic compounds and co-reactant. All of these configurations, however, suffer to some extent from premature coloration.

SUMMARY OF THE INVENTION

Accordingly, an object of the present invention is to provide an improved pressure-sensitive record material.

Another object of the invention is to provide an improved pressure-sensitive record material comprising a self-contained carbonless paper having a single layer of coated, color-forming materials.

A further object of the present invention is to provide a self-contained carbonless paper having a single layer of coated, color-forming materials which does not suffer from premature coloration and which exhibits less print bleed upon imaging than the prior art systems.

Still another object of the invention is to provide self-contained color-forming materials which can be applied in a single coating to a substrate with great production efficiency and cost savings, and which possess a lighter weight, form a homogenous interspersion and provide a coated surface which is easy to decurl.

These and other objects and advantages of the present invention will become apparent to those skilled in the art from a consideration of the following specification and claims.

In accordance with the present invention, the problems encountered in the prior art have been substantially eliminated by providing an improved self-contained, pressure-sensitive record material having a single layer of a coating of color-forming materials wherein the color-forming materials are separately encapsulated, that is, the coated layer includes a uniform interspersed distribution of capsules containing solid particles of co-reactant acidic resin. Thus, the single coated layer of the present invention comprises an encapsulated dye precursor solution and additional capsules of solid co-reactant acidic resin, wherein the co-reactant acidic resin material is not in a solution form inside the capsules as has been taught in the prior art. The improved configuration of the present invention exhibits less print bleed problems upon imaging, which had been encountered with the two capsule systems utilizing a solvent solution of the resin. The decreased tendency for print bleed in accordance with the invention is the result of less solvent inasmuch as one of the color-forming materials comprises particles of solid acidic resin. When both of the color-forming materials were present in solution form, it is believed that approximately twice as much solvent as is desirable had been utilized.

With respect to pressure-sensitive record material systems which employ a red dye precursor therein, such as 3,3-bis(1-ethyl-2-methylindol-3-yl)phthalide (Indolyl Red), which is a commonly employed chromogenic material in these systems, there also appears to be an increased or more efficient red coloration with use of some of the novel systems of this invention as compared to the color-forming systems discussed hereinbefore in which both materials are in solution.

The present invention also represents a significant improvement over the unencapsulated acidic resin particles used in certain prior art self-contained systems because the coating material does not turn blue prematurely, either during production of the coating slurry or after coating on the substrate sheet. During the production of such prior art systems, it was noted that, in the aqueous combination of capsules containing dye solution and unencapsulated acidic resin particles, the slurry had a tendency to turn blue prematurely.

Other advantageous features of the present invention include the utilization of only one coating dispersion with the attendant savings in drying costs, machine time and handling problems during manufacture, the elimination of adhesion problems between coatings, and improved printability of the resulting product. The novel one coat configuration of the present invention also exhibits less yellowing with age than some commercial self-contained systems.

Suitable co-reactant acidic resins which can be employed in the present invention include oil-soluble metal salts of phenolformaldehyde novolak resins of the type disclosed in U.S. Pat. Nos. 3,672,935; 3,732,120; and 3,737,410, the contents of which are hereby expressly incorporated by reference. Such novolak resins have been used in the art for making acid-reactant record material sheets capable of developing color in oily solutions of substantially colorless, chromogenic dye precursor materials. The preferred reactive resin used in the present invention is a zinc-modified resin, more particularly, a zinc-modified, oil-soluble phenol-formaldehyde resin, for example, the zinc salt of para-octylphenol-formaldehyde resin as disclosed in U.S. Pat. No. 3,732,120 or the zinc salt of a para-phenylphenol-formaldehyde resin. Such metal resinate salts can be prepared by the reaction of an oil-soluble phenol-aldehyde resin, preferably a para-octylsubstituted phenol-formaldehyde novolak resin, with the desired metal hydroxide or oxide. Alternatively, a water-soluble intermediate metal resinate may be made by treatment of the resin with a strong aqueous base, such as aqueous sodium hydroxide, to give an aqueous solution of sodium resinate, followed by treatment of the sodium resinate solution with an aqueous solution of a salt of a desired metal such as zinc chloride to bring about a precipitation of the desired metal resinate. Most preferably, the metal-modified resin is prepared by the reaction of an oil-soluble phenol-aldehyde novolak melt with a desired metal carboxylate and a weak base as disclosed in U.S. Pat. No. 3,737,410.

The chromogenic materials which can be used in the present invention include any of the substantially colorless, chromogenic dye precursor compounds which are capable of producing a color upon contact and reaction with the solid co-reactant resin particles discussed hereinabove, for example, Crystal Violet Lactone (CVL), disclosed in U.S. reissue patent 23,024, alone or mixed with any of the many colorless chromogenic materials known in the art, of which a large number are noted in U.S. patents 3,525,630; 3,540,909; 3,540,911; 3,746,562; 3,940,275; and 4,027,065.

In general, the substantially colorless chromogenic dye precursors used in carbonless copy paper are solutions of said chromogenic materials in oily vehicles encapsulated in suitable pressure-rupturable capsules. Alkylated aromatic hydrocarbons as disclosed in U.S. patents 3,627,581 and 3,996,405; and dialkyl phthalates are typical of the oily solvents used as vehicles for such dye precursors. U.S. patent 4,027,065 discloses other diluent hydrocarbon oils which are useful capsule internal phase solvents, and U.S. patent 3,672,935 teaches many dye precursor materials in addition to CVL which may be dissolved in such oily solvents. Typical dialkylamino-fluoran chromogenic compounds are disclosed, for example, in U.S. patent 3,681,390.

A preferred dye precursor mixture employed in the self-contained system of the present invention comprises CVL, 2′-anilino-6′-diethylamino-3′-methylfluoran (N-102 dye), as disclosed in U.S. patent 3,681,390, and Indolyl Red (IR), as disclosed in U.S. patent 3,509,173, in a weight ratio of about 5:5:1 to about 3:3:1, respectively, dissolved in a mixture of an alkylated benzene, preferably a $C_{10}$–$C_{13}$ alkylbenzene, sold by Monsanto Chemical Company under the name Alkylate A-215 and benzyl toluene as disclosed in British patent 1,406,107 or a mixed phthalate ester sold by Monsanto Chemical Company under the name Santicizer 711. This dye mixture produces a blue color upon reaction with the solid, co-reactant acidic resin particles.

Another preferred chromogenic material comprises a mixture of about 0.3 percent by weight of CVL and about 4 percent by weight of N-102 dye dissolved in a mixture of benzyl toluene and an alkylated benzene as described above. This dye mixture produces a black color upon reaction with the solid, co-reactant resin particles.

The chromogenic material and the dry resin particles are separately encapsulated. When encapsulating the dry resin particles, a coacervation technique may be used when the capsules containing the chromogenic material have wall materials produced by polymerization methods. The coacervation technique may employ a water-soluble polymer such as gelatin or albumin in simple coacervation or with gum arabic, carboxymethyl cellulose, sodium alginate, agaragar or dextran sulfate in complex coacervation. The capsules having such wall materials possess a uniform particle size, and can be produced easily by the methods well known in the prior art such as, for example, disclosed in U.S. Pat. Nos. 2,800,457; 3,041,289; and 3,996,405 and U.S. Pat. No. RE. 24,899. Preferably the formation of capsule walls is performed by polymerization methods utilizing monomers or initial condensates of synthetic resins as is taught in U.S. Pat. Nos.3,755,190; 4,001,140; 4,087,376; 4,089,802; and 4,100,103 disclosing resorcinol-formaldehyde filled poly(vinyl alcohol) condensates, urea-formaldehyde resins and melamine-formaldehyde resins, respectively. The most preferred wall unit for encapsulating the dry resin particles in the present invention comprises melamine-formaldehyde resins as disclosed in U.S. Pat. No. 4,100,103.

When encapsulating the chromogenic material a coacervation method may be used if the solid co-reactant acid resin is contained in capsules having wall materials comprising melamine-formaldehyde resins. Preferably the wall material of the capsules containing the chromogenic material comprises capsule wall material produced by polymerization methods utilizing monomers or initial condensates of synthetic resins. Most preferably the wall material of the capsules containing the chromogenic material comprises a melamine-formaldehyde resin.

The encapsulated chromogenic material and the capsules of dry co-reactant acidic resin particles are uniformly dispersed in a liquid medium, for example, water, and applied as a single coating in one pass through a coating machine to a substrate sheet, for example, paper. The liquid slurry can also contain as a binder material for the capsules a cooked starch, preferably a thermally, chemically converted starch having a high solids content of about 23 to 27%. The use of such a starch makes it possible to achieve a higher solids content in the aqueous slurry which reduces the amount of water utilized in the slurry and thus the amount of heat necessary to dry the coating on the paper substrate. Although the use of such a thermally chemically converted starch is not necessary for the urea-formaldehyde and melamine-formaldehyde capsule systems, it is particularly effective when used in the gelatin system.

Because the capsules of chromogenic material and capsules of dry co-reactant acidic resin particles are applied as a single coating to the substrate, a much more uniform interspersion of the capsules is achieved and less coating weight is required, thereby providing a better record sheet stock. Also, because only a single coat is utilized, effective drying of the coating can be achieved with a single pass through the drying apparatus which, of course, greatly contributes to overall production efficiency. The light weight of the self-contained coating also facilitates the decurling of the resulting record sheet material. Moreover, the interspersion of the dye capsules and the encapsulated dry co-reactant acidic resin particles provides improved printability with less print bleed upon pressure rupture thereof.

EXAMPLES OF THE INVENTION

The following Examples are given merely as illustrative of the present invention and are not to be considered as limiting. Unless otherwise noted, the percentages in the examples and throughout the application are by weight.

The test results shown in the examples were determined in the following manner.

In the typewriter intensity (TI) test, a standard pattern is typed on the self-contained coated sheet. The reflectance of the printed area is a measure of the color development on the sheet and is reported as the ratio of the reflectance of the printed area to that of the untyped area ($I/I_o$) and is expressed as a percentage. A TI value of 100 indicates no discernible print and a lower TI value indicates print development.

In the frictional smudge (FS) test, a 9 pound load is applied over a 1⅛ inch×2⅛ rectangular area of a manifold assembly of self-contained sheets. While this load is being applied, a sheet is pulled 11½ inches relative to a stationary sheet in the assembly. The smudge area reflectance and the background reflectance are then measured. The FS test results are reported as the ratio of the reflectance values of the smudged area and the background ($I/I_o$) and are expressed as a percentage. A value of 100 for smudge intensity represents no smudge color at all and the lower the value, the less the smudge protection.

EXAMPLE 1

The co-reactant acidic resin particles were encapsulated by means of a coacervation procedure as disclosed in U.S. Pat. Nos. 3,041,289 and 3,996,405.

To 232 parts of water were added 117 parts of a 9% gelatin solution (Wilson-Sinclair 150 bloom gelatin) and 70 parts of a 10% gum arabic solution. This solution was heated to 55° C., while the pH was adjusted from 4.4 to 6.2 with a 20% caustic soda solution. Then, 177 parts of a 55% dispersion of a zinc-modified p-octylphenol-formaldehyde polymer (as disclosed in U.S. Pat. No. 3,737,410) in water was added while the solution was constantly stirred. Added dropwise to this dispersion was 6 parts of a 5% aqueous solution of a polyvinyl methyl ether-maleic anhydride copolymer. About 21 parts of 14.7% acetic acid was added dropwise, and the resulting pH of the dispersion was about 5.2. The solution was then chilled to 10° C., and 2.5 parts of 50% glutaraldehyde was added thereto. After one hour of continuous stirring, 10 parts of a 5% aqueous solution of polyvinyl methyl ether-maleic anhydride copolymer (the pH of which had been adjusted to 8.0) was added dropwise. After one more hour of continuous stirring, the pH was adjusted from 5.4 to 7.0 with a 20% caustic soda solution. After one final hour of stirring, the pH was raised to 9.0 with a 20% caustic soda solution.

EXAMPLE 2

In this Example, the co-reactant acidic resin particles were encapsulated by means of a polymerization method where the wall material comprises urea-formaldehyde resins as disclosed in U.S. Pat. No. 4,001,140.

Thirteen parts of urea and 1.3 parts of resorcinol were dissolved in 101 parts of water. Then, 130 parts of a 10% solution of ethylene maleic anhydride copolymer in water (Monsanto EMA-31, a copolymer with approximately equimolar amounts of ethylene and maleic anhydride units and having a molecular weight of about 75,000 to 90,000) and 400 parts of a 55% dispersion of a zinc-modified p-octylphenol-formaldehyde polymer (as disclosed in U.S. Pat. No. 3,737,410) in water were added to the solution. The mixture was heated to 57° C., and while stirring constantly, 32 parts of 37% formaldehyde was added thereto. The heating was maintained for about three hours and then discontinued.

EXAMPLE 3

In this Example, the co-reactant acidic resin particles were encapsulated by means of a polymerization method where the wall material comprises melamine-formaldehyde resins as disclosed in U.S. Pat. No. 4,100,103.

A solution of 86.67 parts of a 10% aqueous solution of ethylene maleic anhydride copolymer (EMA-31) was mixed with 400.00 parts of water. The mixture had a pH of 2.5 which was raised to 3.96 by the dropwise addition of 20% NaOH. To this solution was added 42.25 parts of 80% etherified methylol melamine resin solution (Resimene 714, supplied by Monsanto Chemical Co.) and 400 parts of a 54% zinc-modified resin dispersion as described in Example 1. The entire mixture was placed in a water bath at 56° C. and stirred vigorously with a turbine blade stirrer at 300 rpm. After 2½ hours of stirring, the heating was discontinued but the batch was continuously stirred overnight.

EXAMPLE 4

In this Example chromogenic material was encapsulated by means of a coacervation technique.

Oily dye solution capsules were prepared comprising 0.75% of 3,3-bis-(4-dimethylaminophenyl)-6-dimethylaminophthalide (Crystal Violet Lactone), 0.75% of 2'-anilino-6'-diethylamino-3'-methylfluoran (N-102) and 0.25% of 3,3-bis-(1-ethyl-2-methylindol-3-yl)-phthalide (Indolyl Red) in a mixture of 90 parts of a $C_{10}$–$C_{13}$ alkylbenzene and 10 parts of mixed phthalate ester (Santicizer 711). Such capsules are well known in the art and can be prepared by the procedure as described in, for example, U.S. Pat. Nos. 3,041,289 and 3,996,405 and in Example 1.

EXAMPLE 5

In this Example chromogenic material was encapsulated by means of a polymerization method where the wall material comprises urea-formaldehyde resins.

Oily dye solution capsules were prepared comprising 0.75% of 3,3-bis-(4-dimethylaminophenyl)-6-dimethylaminophthalide (Crystal Violet Lactone), 0.75% of 2'-anilino-6'-diethylamino-3'-methylfluoran (N-102) and 0.15% of 3,3-bis-(1-ethyl-2-methylindol-3-yl) phthalide (Indolyl Red) in a mixture of 80 parts of a $C_{10}$–$C_{13}$ alkylbenzene and 20 parts of benzyl toluene. Such capsules can be prepared by the procedure as described in Example 2 and in U.S. Pat. No. 4,001,140.

EXAMPLE 6

In this Example chromogenic material was encapsulated by means of a polymerization method where the wall material comprises melamine-formaldehyde resins.

Oily dye solution capsules were prepared comprising 0.75% of 3,3-bis-(4-dimethylaminophenyl)-6-dimethylaminophthalide (Crystal Violet Lactone), 0.75% of 2'-anilino-6'-diethylamino-3'-methylfluoran (N-102) and 0.15% of 3,3-bis-(1-ethyl-2-methylindol-3-yl)phthalide (Indolyl Red) in a mixture of 80 parts of a $C_{10}$–$C_{13}$ alkylbenzene and 20 parts of benzyl toluene. Such capsules can be prepared by the procedure as described in Example 3 and in U.S. Pat. No. 4,100,103.

EXAMPLES 7–15

One coat self-contained pressure-sensitive record materials were prepared by mixing appropriate capsules from Examples 1–6 and coating the mixture in a single pass on an air knife coating machine using 39 grams/square meter (gm/m²) paper basestock. The following materials and quantities were used in the coating mixtures:

| | Parts Dry |
|---|---|
| Capsules Containing Chromogenic Materials | 26.25 |
| Cooked Corn Starch Binder (25% solids) | 7.50 |
| Uncooked Wheat Starch (92% solids) | 8.62 |
| Calcined Kaolin Clay (Ansilex)* | 8.25 |
| Capsules Containing Phenolic Resin | 9.98 |
| Poly(vinylpyrrolidone)PVPK30 (Mfg. by GAF Corp.) | 0.38 |
| Poly(vinylpyrrolidone)PVPK15 (Mfg. by GAF Corp.) | 0.38 |
| Kaolin Clay Slurry (68% solids) | 13.65 |

*Manufactured by Engelhard Minerals and Chemicals Corporation according to U.S. Pat. No. 3,383,438 and 3,586,523.

Sufficient water was added to yield 300 parts total on a wet basis in the coating mixture.

Using the foregoing formulation, the following combinations were used to prepare the following one-coat self-contained pressure-sensitive record materials:

| Example | Chromogenic Capsule Ex. No. | Phenolic Resin Capsule Ex. No. | Total Coat Weight gm/m² |
|---|---|---|---|
| 7 | 4 | 1 | — |
| 8 | 4 | 2 | — |
| 9 | 4 | 3 | 12.5 |
| 10 | 5 | 1 | 9.2 |
| 11 | 5 | 2 | 9.6 |
| 12 | 5 | 3 | 9.7 |
| 13 | 6 | 1 | 9.6 |
| 14 | 6 | 2 | 9.6 |
| 15 | 6 | 3 | 9.6 |

EXAMPLES 16–18

In addition to one-coat self-contained pressure-sensitive record materials made by coating mixtures of capsules containing chromogenic materials and capsules containing acidic phenolic resin particles, coating mixtures containing capsules of chromogenic materials and unencapsulated acidic phenolic resin dispersions were prepared. The following materials and quantities were used in the coating mixtures:

| | Parts Dry |
|---|---|
| Capsules Containing Chromogenic Materials | 26.25 |
| Cooked Corn Starch Binder (25% solids) | 7.50 |
| Uncooked Wheat Starch (92% solids) | 8.62 |
| Calcined Kaolin Clay (Ansilex) | 8.25 |
| Acidic Phenolic Resin Dispersion (54% solids) | 9.98 |
| Poly(vinylpyrrolidone)PVPK30 | 0.38 |
| Poly(vinylpyrrolidone)PVPK15 | 0.38 |
| Kaolin Clay Slurry (68% solids) | 13.65 |

To the resulting mixture was added sufficient water to bring the total wet parts to 300.

Using the foregoing formulation, the following combinations of phenolic resin dispersion and capsules containing chromogenic materials were prepared:

| Example | Chromogenic Capsule Ex. No. |
|---|---|
| 16 | 4 |
| 17 | 5 |
| 18 | 6 |

The self-contained pressure-sensitive record materials of Examples 7 through 18 were subjected to the functional tests of typewriter intensity (TI) and frictional smudge (FS), and the background intensities (BI) of the coatings were determined by measuring the reflectance of non-imaged areas of the coatings ($I_o$). The results are shown in Table I.

Table I

| Example No. | BI | TI | FS | Chromogenic Material Capsule Example No. | Phenolic Resin Capsule Example No. |
|---|---|---|---|---|---|
| 7 | 23.5 | — | — | 4 | 1 |
| 8 | 27.0 | — | — | 4 | 2 |
| 9 | 77.5 | 67.5 | 71.5 | 4 | 3 |
| 10 | 72.0 | 62.0 | 85.5 | 5 | 1 |
| 11 | 75.5 | 63.5 | 85.0 | 5 | 2 |
| 12 | 78.5 | 65.0 | 85.5 | 5 | 3 |
| 13 | 81.5 | 54.0 | 80.5 | 6 | 1 |
| 14 | 82.5 | 52.5 | 76.5 | 6 | 2 |
| 15 | 83.5 | 57.5 | 80.0 | 6 | 3 |
| 16 | 18.0 | — | — | 4 | — |
| 17 | 68.5 | 57.5 | 80.0 | 5 | — |
| 18 | 80.5 | 44.5 | 69.0 | 6 | — |

A satisfactory background intensity (BI) should be a number greater than about 70 (the higher the number the less color development; a measurement of 92 represents no color development). Thus, no additional test data were run on Examples 7, 8 and 16, which showed a large amount of background color development.

A satisfactory frictional smudge (FS) reading should be greater than about 70.

Using the foregoing functional performance criteria, it can be seen from the test data that when the unencapsulated acidic phenolic resin is used (Examples 16, 17, 18) no satisfactory combination is obtained for any one-coat self-contained pressure-sensitive record materials. When each component is contained within a capsule, satisfactory combinations of functional properties are obtained on all but the combinations of chromogenic material in a coacervation capsule with the resin particles in a coacervation capsule or a urea-formaldehyde capsule (Examples 7 or 9).

The invention being thus described, it will be obvious that the same may be varied in many ways. Such variations are not to be regarded as a departure from the spirit and scope of the invention, and all such modifications are intended to be included within the scope of the following claims.

What is claimed is:

1. A self-contained pressure-sensitive record sheet material which comprises:

(a) a substrate and (b) a coating on at least one surface of the substrate comprising a single layer of interspersed i. color-forming pressure-rupturable capsules of an oily solvent solution of at least one substantially colorless chromogenic compound and ii. capsules of solid acidic co-reactant resin particles substantially free of a liquid component, said co-reactant resin being capable of producing a color upon contact with said chromogenic compound, the capsule walls being materials selected from the group consisting of water soluble polymers formed by coacervation, urea-formaldehyde polymers formed by polymerization and melamine-formaldehyde polymers formed by polymerization; provided that when said capsules of chromogenic compound are produced by coacervation, said capsules of co-reactant resin are produced by melamine-formaldehyde polymerization.

2. The pressure-sensitive record sheet material of claim 1, wherein the capsules of solid acidic co-reactant resin particles are produced by melamine-formaldehyde polymerization.

3. The pressure-sensitive record sheet material of claim 1, wherein the capsules of chromogenic compound are produced by melamine-formaldehyde polymerization.

4. The pressure-sensitive record sheet material of claim 1, wherein the capsules of chromogenic compound and the capsules of co-reactant resin particles are both produced by melamine-formaldehyde polymerization.

5. The pressure-sensitive record sheet material of claim 1, wherein the substrate is paper.

6. The pressure-sensitive record sheet material of claim 1, wherein the solid co-reactant resin particles comprise a metal salt of a phenol-formaldehyde novolak resin.

7. The pressure-sensitive record sheet material of claim 6, wherein the co-reactant resin is a zinc-modified, para-octylphenolformaldehyde resin.

8. The pressure-sensitive record sheet material of claim 1, wherein the chromogenic compound comprises Crystal Violet Lactone.

9. The pressure-sensitive record sheet material of claim 1, wherein the chromogenic compound comprises Crystal Violet Lactone and 2'-anilino-6'-diethylamino-3'-methylfluoran.

10. The pressure-sensitive record sheet material of claim 1, wherein the chromogenic compound comprises Crystal Violet Lactone, 2'-anilino-6'-diethylamino-3'-methylfluoran and Indolyl Red.

11. The pressure-sensitive record sheet material of claim 1, wherein the capsules of solid co-reactant resin particles comprise gelatin.

12. A manifold assembly comprising a plurality of self-contained pressure-sensitive record sheets as defined in claim 1.

13. A color-producing coating composition which comprises:

(i) an aqueous dispersion of pressure-rupturable capsules of an oily solvent solution of at least one substantially colorless chromogenic compound and (ii) capsules of solid acidic co-reactant resin particles substantially free of a liquid component, said co-reactant resin being capable of producing a color upon contact with said chromogenic compound, the capsule walls being materials selected from the group consisting of water soluble polymers formed by coacervation, urea-formaldehyde polymers formed by polymerization and melamine-formaldehyde polymers formed by polymerization; provided that when said capsules of chromogenic compound are produced by coacervation, said capsules of co-reactant resin are produced by melamine-formaldehyde polymerization.

14. The color-producing coating composition of claim 13, wherein the capsules of solid acidic co-reactant resin particles are produced by melamine-formaldehyde polymerization.

15. The color-producing coating composition of claim 13, wherein the capsules of chromogenic compound are produced by melamine-formaldehyde polymerization.

16. The color-producing coating composition of claim 13, wherein the capsules of chromogenic compound and the capsules of co-reactant resin particles are both produced by melamine-formaldehyde polymerization.

17. The color-producing coating composition of claim 13, wherein the solid co-reactant resin particles comprise a metal salt of a phenol-formaldehyde novolak resin.

18. The color-producing coating composition of claim 17, wherein the co-reactant resin is a zinc-modified, para-octylphenol-formaldehyde resin.

19. The color-producing coating composition of claim 13, wherein the chromogenic compound comprises Crystal Violet Lactone.

20. The color-producing coating composition of claim 13, wherein the chromogenic compound comprises Crystal Violet Lactone and 2'-anilino-6'-diethylamino-3'-methylfluoran.

21. The color-producing coating composition of claim 13, wherein the chromogenic compound comprises Crystal Violet Lactone, 2'-anilino-6'-diethylamino-3'-methylfluoran and Indolyl Red.

22. The color-producing coating composition of claim 13, wherein the capsules of solid co-reactant resin particles comprise gelatin.

23. A process for producing a self-contained pressure-sensitive record sheet material which comprises applying the color-producing coating composition of claim 13 in a single pass through a coating means to at least one surface of a substrate sheet, and drying the resultant coating in a single pass through a drying means.

24. The process of claim 23, wherein the substrate is paper.

25. Minute capsules of solid particles of an oil-soluble metal salt of a phenol-formaldehyde novolak resin substantially free of a liquid component, the capsule walls being materials selected from the group consisting of water soluble polymers formed by coacervation, urea-formaldehyde polymers formed by polymerization and melamine-formaldehyde polymers formed by polymerization.

26. The capsules of claim 25, wherein the resin is a zinc-modified para-octylphenol-formaldehyde resin.

* * * * *